United States Patent [19]
Schubring et al.

[11] Patent Number: 5,273,336
[45] Date of Patent: Dec. 28, 1993

[54] PIVOTALLY MOUNTED SEAT BACK

[75] Inventors: James D. Schubring, Davisburg; Donald W. Kulish, Farmington Hills, both of Mich.

[73] Assignee: General Motors Corporation, Detroit, Mich.

[21] Appl. No.: 4,047

[22] Filed: Jan. 15, 1993

[51] Int. Cl.⁵ .................................................. B60N 1/02
[52] U.S. Cl. ........................................ 296/65.1; 296/63; 297/232; 297/378.1
[58] Field of Search .................. 296/65.1, 63, 69, 64; 297/379, 378, 232

[56] References Cited
U.S. PATENT DOCUMENTS

| | | | |
|---|---|---|---|
| 2,673,593 | 3/1954 | Hendrickson | 155/116 |
| 3,596,981 | 3/1971 | Koziol | 297/64 |
| 4,200,329 | 4/1980 | Inami et al. | 296/69 |
| 4,708,385 | 11/1987 | Kondo | 296/65.1 |
| 4,958,877 | 9/1990 | Lezotte et al. | 296/65.1 |
| 4,971,395 | 11/1990 | Coussemacq et al. | 296/65.1 X |
| 5,015,026 | 5/1991 | Mouri | 296/65.1 |

*Primary Examiner*—Joseph D. Pape
*Attorney, Agent, or Firm*—William A. Schuetz

[57] ABSTRACT

A motor vehicle has a rear seat that comprises a bench seat and a seat back that is split. Each seat back part is pivotally mounted so that it folds down onto the bench seat to extend the load floor. Each seat back part is pivotally supported by a fixed pivot at the vehicle body or outboard side and a spring biased pivot at the inboard or center side that retracts to facilitate installation.

10 Claims, 2 Drawing Sheets

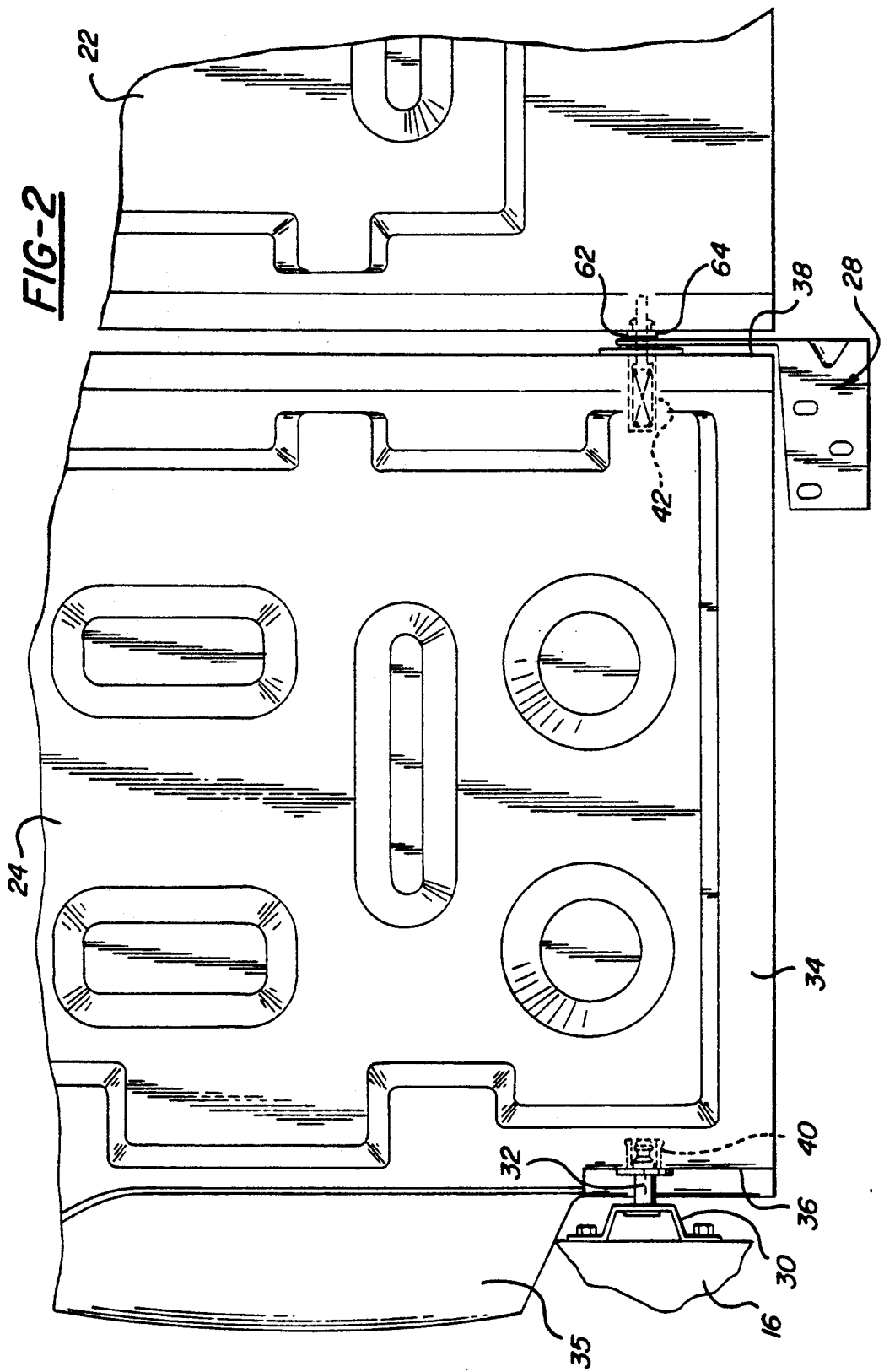

PIVOTALLY MOUNTED SEAT BACK

BACKGROUND OF THE INVENTION

This invention relates to pivotally mounted seat backs for motor vehicles, a method of installing pivotally mounted seat backs in motor vehicles and a retractable pivot pin assembly for pivotally mounting seat backs in a motor vehicle.

Pivotally mounted seat backs are a very desirable optional feature in many passenger cars, particularly station wagons. These seat backs pivot down onto the rear passengers seats. This extends the rear load floor of the station wagon or the trunk floor of the passenger car to increase its cargo carrying capacity.

In some instances it is also desirable to split the seat back into two parts that can be pivoted down onto the rear seat independently of each other. In this instance one part can be pivoted down onto the rear seat to provide a partially extended rear load or trunk floor on one side of the vehicle that is especially well suited for transporting long items such as skis. The other part can then stay up to retain passenger carrying capability on the other side.

SUMMARY OF THE INVENTION

The object of this invention is to provide a pivotally mounted seat back for motor vehicles that makes efficient use of available space.

Another object of this invention is to provide a pivotally mounted seat back that is easy to install.

Still another object of this invention is to provide a pivotally mounted seat back that can be installed on brackets that are attached to generally vertical body panels instead of floor mounted brackets at the outboard side or sides so that the seat bottom can extend for the full width of the vehicle.

In another aspect, an object of this invention is to provide an efficient and unique method of installing pivotally mounted seat backs in motor vehicles.

In yet another aspect, an object of this invention is to provide an economical and compact retractable pivot pin assembly for pivotally mounting seat backs in a motor vehicle.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 2 is a rear view of the rear passenger seat that is shown in FIG. 1;

DESCRIPTION OF THE INVENTION

Figure 1:
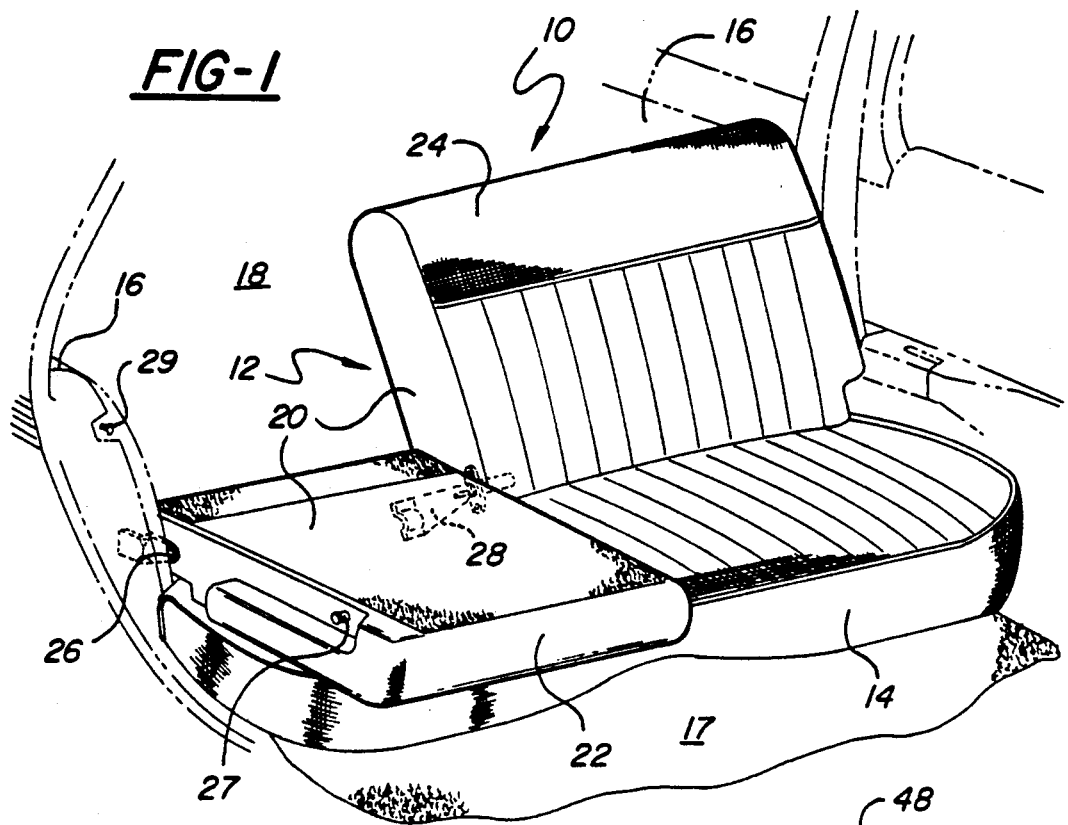
FIG. 1 is a front perspective view of a split back rear passenger seat installation having pivotally mounted seat backs in accordance with the invention.

Referring now to the drawing, FIG. 1 shows a motor vehicle 10 of the station wagon type that has a rear passenger seat generally indicated at 12. The rear passenger seat comprises a bottom in the form of a bench seat 14 that is secured to the vehicle floor in a suitable manner (not shown). The bench seat 14 extends for the full width of the rear passenger compartment between the rear doors and consequently the ends of the bench seat are disposed in front of the generally vertical vehicle body panels 16 on each side of the rear load floor 18 that cover the rear wheel housings.

The rear passenger seat has a seat back 20 that is pivotally mounted in the motor vehicle 10 so that it can be folded down onto the bench seat 14 so as to extend the rear load floor 18 and thereby increase the cargo carrying capability of the station wagon type motor vehicle 10.

The seat back 20 is split 60–40 and each part pivots independently of the other. Consequently one part, such as smaller seat back 22 can be pivoted down onto the bench seat 14 to extend the rear floor 18 on one side of the vehicle while the other part, such as larger seat back 24 remains upright for carrying passengers. This is illustrated in FIG. 1.

The seat back 22 is pivotally supported on two laterally spaced brackets 26 and 28 as shown in FIG. 1. Bracket 26 is a wall bracket that is attached to the body panel 16 that covers the left wheel housing that is located behind the seat back 22 when it is in an upright position. The seat back 22 is releasably retained in the upright position (not shown) by a conventional latch comprising parts 27 and 29 that are attached cooperatively to the seat back 22 and the body panel 16 respectively.

Bracket 28 is a center bracket that extends between the seat backs 22 and 24. It is attached to a generally vertical, steeply sloped transition that connects the lower passenger compartment floor 17 to the higher rear load floor 18. The center bracket 28 is attached to the transition at a location that is behind the bench seat 14 and that is below the height of the rear load floor 18. Consequently there is minimal interference between the center bracket 28 and the bench seat 14 that can be accommodated by a small notch (not shown) in the back of the bench seat 14.

The seat back 24 is also pivotally supported on two laterally spaced brackets as best shown in FIG. 2. These are the center bracket 28 and a second wall bracket 30 that is attached to the body panel 16 that covers the right wheel housing that is behind the seat 24 when it is in an upright position as shown in FIG. 2. The seat back 24 is releasably retained in this upright position by a conventional latch as explained in connection with seat back 22. The wall bracket 30 carries a fixed pivot pin 32 that is supported on the wall bracket 30 at one end in cantilever fashion so that it projects into the interior of the vehicle.

The seat back 24 comprises a thermoplastic support shell 34 that is fitted with an upholstered back cushion 35. The shell 34 has sides 36 and 38 that are spaced apart to fit between the center bracket 28 and the wall bracket 30. Outboard side 36 has an opening for a bushing 40 that is housed in the seat back 24 to receive the pivot pin 32 for pivotally supporting one side of the seat back 24.

Figure 4:
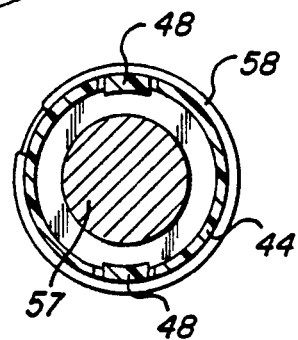
FIG. 4 is a section taken substantially along the line 4—4 of figure looking in the direction of the arrows.
Figure 3:
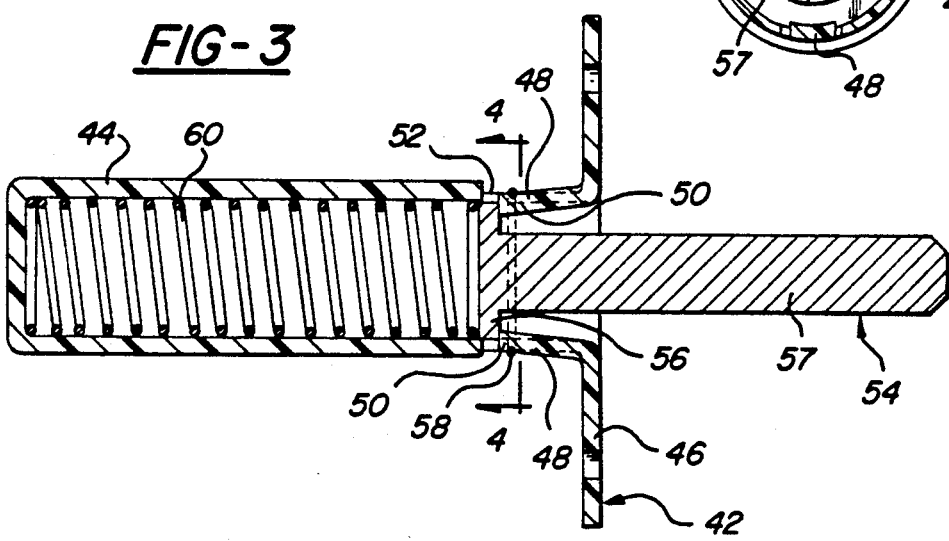
FIG. 3 is a longitudinal section of a retractable pivot pin assembly of this invention that is used in the installation that is shown in FIGS. 1 and 2.

Inboard side 38 has an opening for mounting a retractable pivot pin assembly 42 in the seat back 24 that is shown in detail in FIGS. 3 and 4.

The pivot pin assembly 42 comprises a cylindrical housing 44 that has a closed end, an open end and a flange 46 at the open end for attaching the housing 44 to the inboard side 38 of the seat back 24 in a flush manner. The housing 44 further includes a pair of circumferentially spaced, diametrically opposed spring fingers 48 that are integrally attached to the cylindrical wall of the housing 44 adjacent the open end. The spring fingers 48 slant radially inwardly into the housing 44 toward the rear or closed end to provide retaining portions 50 that project into the housing. The housing 44 has an external circumferential groove 52 in its cylindrical wall that is intersected by the free ends of the spring fingers 48.

The pivot pin assembly 42 further comprises a retractable pivot pin 54 that has a round head 56 and a shank 57. The round head 56 is slideably disposed in the cylindrical housing 44 so that the shank 57 extends out the open end. The round head is retained in the cylindrical housing 44 by the spring fingers 48. A spring clip 58 is mounted in the external groove 52 of the housing 44 so that it engages external surfaces of the spring fingers 48 to maintain the retaining portions 50 in a retaining position in the housing 44.

The pivot pin assembly 42 includes a compression spring 60 that is disposed in the housing 44 and engages the round head 56 of the pivot pin 54 to bias it outwardly against the retaining portions 50 of the spring fingers 48. The pivot pin 54 preferably has a length that is sufficiently less than the length of the housing 44 so that the entire pivot pin 54 including the shank 57 is retractable into the housing 44 against the bias of the compression spring 60. This maximizes ease of assembly as described below.

The pivot pin assembly 42 is mounted in the seat back 24 so that the shank 57 projects outwardly of the side 38 under the bias of the spring 60 as shown in FIG. 2. In this condition, the shank 57 projects through a center bushing 62 that is mounted on the center bracket 28 to pivotally support the center or inboard side of the seat back 24.

The shank 57 also projects into a bushing 64 that is housed in an inboard or center side of the seat back 22 to pivotally support one side of the seat back 22. The outboard side of the seat back 22 is pivotally supported by bracket, pivot and socket arrangement that is identical to that shown in FIG. 2 for the outboard side of the seat back 24.

The seat backs 22 and 24 are installed in the following manner. The seat back 24 is skewed and the outboard side 36 is plugged onto the fixed pivot pin 32 that is attached to the wall bracket 30 so that the fixed pivot pin 32 is inserted into the bushing 40. The retractable pivot pin 54 is then retracted into its housing 44 against the bias of spring 44 until the end of the shank 57 is substantially flush with flange 46. The seat back 28 is swung into alignment with the center bushing 62 while the retractable pivot pin 54 is held in the retracted position. The retractable pivot pin 54 is then released when it aligns with the bushing 62 so that the shank 57 projects through the bushing 62. This would complete the installation of a one piece seat back in which case the bushing 62 would be supported on a wall bracket on the opposite side of the vehicle.

When installing a split back seat, however, the second seat back, such as the seat back 22 is installed in substantially the same manner either before or after the first seat back 24. Either way, the seat back 22 is first skewed and then plugged onto the fixed pivot pin at the outboard side. The partially supported seat back 22 is then swung into alignment with the center bushing 62 while the retractable pivot pin 54 is held in the retracted position where the end of the shank 57 is substantially flush with the adjacent face of the center bushing 62. The retractable pivot pin 54 is then released so that the shank 57 projects into the bushing 64 on the inboard side of the seat back 22.

While the fixed pivot pins, bushings and retractable pivot pin have been described as being attached to the vehicle body, one or the other side of the seat backs or the center bracket, it should be understood that the positions are reversible and interchangeable. For instance the fixed pivots could be attached to the seat backs and their cooperating bushings attached to the wall brackets. Similarly a retractable pivot pin assembly could be attached to the one of the wall brackets in the case of a single seat back installation or to each of the wall brackets in the case of a split seat back installation. This last case points out the advantage of locating the retractable pivot pin 54 in the inboard side of one seat back in a split back installation since it eliminates the need for a second retractable pivot pin.

In other words, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A method of installing a seat back in a motor vehicle comprising;
   providing first and second laterally spaced vertical supports in a motor vehicle,
   providing a seat back that has first and second sides that are laterally spaced apart to fit between the vertical supports,
   attaching a fixed pivot pin to one of said first side of the seat back and said first vertical support and attaching a first cooperating bushing to the other of said first side of said seat back and said first vertical support,
   attaching a retractable pivot pin to one of said second side of the seat back and said second vertical support and attaching a second cooperating bushing to the other of said second side of said seat back and said second vertical support,
   skewing the seat back and inserting the fixed pivot pin into the first cooperating bushing so that the seat back is supported on the first vertical support,
   retracting the retractable pivot pin and swinging the seat back into a position where the retractable pivot pin aligns with the second cooperating bushing, and
   releasing the retractable pivot pin so that it engages in the second cooperative bushing so that the seat back is pivotally supported on the first and second vertical supports.

2. A method of installing a seat back in a motor vehicle comprising:
   providing first and second laterally spaced vertical supports in a motor vehicle,
   providing a seat back that has first and second sides that are laterally spaced apart to fit between the vertical supports,
   attaching a fixed pivot pin to one of said first side of the seat back and said first vertical support and attaching a first cooperating bushing to the other of said first side of the seat back and said first vertical support, attaching a housing containing a slidable pivot pin to one of the second side of the seat back and said second vertical support in a flush manner and attaching a second cooperating bushing to the other of said second side of said seat back and said second vertical support for receiving the pivot pin when it is extended out of the housing, the pivot pin being spring biased to an extended position and retractable entirely into the housing, skewing the seat back and inserting the fixed pivot pin into the first cooperating bushing so that the seat back is supported on the first vertical support, retracting the retractable pivot pin entirely into its housing and swinging the seat back into a position where the retractable pivot pin aligns with the second cooperating bushing, and releasing the retractable pivot pin so that it engages in the second cooperative bushing so that the seat back is pivotally supported on the first and second vertical supports.

3. The method of installing the seat back as defined in claim 2 wherein:

the housing for the retractable pivot pin is attached to the second side of the seat back, the second cooperatively bushing is attached to the second vertical support;

the second vertical support is a middle vertical support that extends between the seat back and a second companion seat back, and the releasable pivot pin extends through the second bushing of the first vertical support to pivotally support one end of the second companion seat back.

4. A seat back that is adapted for pivotal mounting on first and second laterally spaced vertical supports in a motor vehicle comprising:

the seat back having first and second sides that are spaced apart to fit between the laterally spaced vertical supports, one of said first side of said seat back and said first vertical support having a fixed pivot pin and the other of said first side of said seat back and said first vertical support having a cooperating bushing for engaging said fixed pivot pin, and the seat back having a retractable pivot pin attached to the second side of the seat back for engaging in a second cooperating bushing in the second vertical support, so that the seat back can be pivotally mounted in a motor vehicle by engaging the fixed pivot pin in the cooperating bushing to support the seat back on the first vertical support and then retracting the retractable pivot pin and swinging the seat back into a position where the retractable pivot pin engages in the cooperating bushing in the second vertical support when it is released.

5. The seat back as defined in claim 4 wherein the retractable pivot pin slides in a housing that is attached to the seat back so that an open end of the housing is substantially flush with an exterior surface of the second side.

6. The seat back as defined in claim 5 wherein the pivot pin is spring biased to an extended position and is retractable into the housing against the bias of the spring.

7. The seat back as defined in claim 6 wherein the pivot pin is retractable entirely into the housing against the bias of the spring so that it does not interfere with the second vertical support when the seat back is swung into position.

8. A retractable pivot pin assembly for a pivotally mounted seat back comprising:

a housing having a closed end and an open end, the housing having means for attaching the housing to a side of a seat back in a flush manner and retaining portions that project into the housing, a pivot pin that is slideably disposed in the housing and retained by the retaining portions of the housing, spring means in the housing biasing the pivot pin to an extended position against the retaining portions of the housing, and clip means maintaining the retaining portions of the housing in a retaining position.

9. The pivot assembly as defined in claim 8 wherein the entire pivot pin retracts into the housing.

10. A retractable pivot pin assembly for a pivotally mounted seat back comprising:

a cylindrical housing having a closed end and an open end, the housing having a flange at the open end for attaching the housing to a side of a seat back in a flush manner, the housing having circumferentially spaced spring fingers integrally attached to a cylindrical wall of the housing adjacent the open end of the housing, the spring fingers having outer external surfaces and inner retaining portions that project into the housing, the housing having an external circumferential groove that is intersected by the spring fingers, a pivot pin that has a round head that is slideably disposed in the cylindrical housing and retained in the cylindrical housing by the spring fingers, a spring clip disposed in the external groove of the housing and engaging the external surfaces of the spring fingers to maintain the retaining portions of the spring fingers in a retaining position in the housing, a compression spring disposed in the housing and engaging the round head of the pivot pin to bias it outwardly against the retaining portions of the spring fingers, and the pivot pin having a length that is sufficiently less than the length of the housing so that the entire pivot pin is retractable into the housing against the bias of the compression spring.

* * * * *